US 6,671,966 B2

(12) United States Patent
Lewis (10) Patent No.: US 6,671,966 B2
(45) Date of Patent: Jan. 6, 2004

(54) HYDRAULIC AND PNEUMATIC ACTUATED CUTTING APPARATUS

(75) Inventor: John B. Lewis, Reedsport, OR (US)

(73) Assignees: Calvin R. MacKay, Provo, UT (US); John E. Lewis, Reedsport, OR (US)

( * ) Notice: Subject to any disclaimer, the term of this patent is extended or adjusted under 35 U.S.C. 154(b) by 0 days.

(21) Appl. No.: 10/038,013

(22) Filed: Oct. 23, 2001

(65) Prior Publication Data

US 2003/0074796 A1 Apr. 24, 2003

(51) Int. Cl.[7] .............................................. B26B 15/00
(52) U.S. Cl. ............................. 30/228; 30/92; 30/241; 92/182
(58) Field of Search ........................... 30/228, 241, 92; 91/52, 325, 422; 92/182, 185

(56) References Cited

U.S. PATENT DOCUMENTS

| | | | | | |
|---|---|---|---|---|---|
| 2,612,140 A | * | 9/1952 | Miller | ........................ | 30/228 |
| 3,224,378 A | * | 12/1965 | Graham | ....................... | 92/182 |
| 3,373,490 A | * | 3/1968 | Lendaro | ...................... | 30/228 |
| 3,476,015 A | * | 11/1969 | Ackley | .......................... | 30/228 |
| 4,587,732 A | * | 5/1986 | Lind et al. | .................... | 30/228 |
| 4,949,461 A | * | 8/1990 | van der Merwe et al. | .... | 30/228 |
| 5,016,524 A | * | 5/1991 | Kawai et al. | ................. | 92/182 |
| 5,172,479 A | * | 12/1992 | Keeton | ......................... | 30/228 |
| 5,715,681 A | * | 2/1998 | Williamson | .................. | 92/182 |

* cited by examiner

Primary Examiner—Hwei-Siu Payer
(74) Attorney, Agent, or Firm—Workman Nydegger (57) ABSTRACT

A hydraulically and/or pneumatically actuated cutting tool is provided having a housing with a piston assembly slidably disposed between a fluid inlet and a fluid outlet. The piston assembly comprises a seal which is operable between two positions. In a first position the seal produces a substantially water-tight seal between the piston and the interior surface of the housing. As a result, fluid entering the chamber through the fluid inlet advances the piston assembly toward the fluid outlet. In a second position a gap is formed between the seal and the interior surface of the housing such that fluid communication is established between the fluid inlet and the fluid outlet. As the fluid is removed from the housing through the fluid outlet, a spring biases the piston assembly back to its original resting position.

22 Claims, 8 Drawing Sheets

HYDRAULIC AND PNEUMATIC ACTUATED CUTTING APPARATUS

CROSS-REFERENCE TO RELATED APPLICATIONS

Not Applicable.

BACKGROUND OF THE INVENTION

1. The Field of the Invention

The present invention relates to cutting tools. More particularly, the present invention relates to hydraulically and/or pneumatically actuated cutting tools.

2. The Relevant Technology

Various types of cutting tools are known for cutting branches, pipes, solid objects, and the like. Such cutting tools may range from a simple knife to tools which utilize principles of science to enhance the cutting ability of the tool. For example, pruning shears rely on principals of physics to magnify the strength of the user. However, previous cutting tools, such as pruning shears, required the user to grasp a pair of handles which required additional balance as well as strength. Thus, hydraulic devices were developed to enhance the ability of the user to cut objects without requiring so much of the user's strength. However, present hydraulic cutting devices have various limitations.

One problem that currently exists in the art is that present hydraulic devices require a number of movable parts in order to effectuate release of pressure inside the tool. Such requirement of mechanical parts results in potential failing of the tool and is also difficult to repair. Additionally, such need for mechanical parts results in additional manufacturing costs. Thus, it would be an advantage in the art to have a hydraulic cutting tool having minimal parts and minimal manufacturing costs.

Typically, cutting devices utilize a standard garden hose, taking advantage of water pressure to actuate the cutting tool. A problem exists in the art in that present hydraulic devices are not adaptable to use various types of fluid sources. For example, a person may want to use a cutting tool in a machine shop, but does not have or does not want to use the water source that prior art devices have required. It would be an advantage in the art to be able to utilize different sources of fluid pressure to facilitate certain tasks.

An additional need that exists in the art is the ability to adjust the length and utility of the cutting tool. For example, a user may need a cutting tool of different lengths. Alternatively, a user may want to replace the cutting blade with a different attachment, but is unable to with existing hydraulic devices. It would thus be an advantage in the art to have a cutting tool which allowed the user to vary the size and type of attachment. Further, as longer attachments are used, more strength must be provided in the cutting tool to support longer attachments.

Finally, as with all cutting apparatuses, safety is always an important factor. Previous hydraulic tools did not provide the safety mechanisms desired to operate a tool safely and effectively.

BRIEF SUMMARY OF THE INVENTION

One embodiment of the present invention comprises a housing having disposed therein a piston assembly. Fluid enters in one end of the housing and advances the piston assembly toward the other end. The piston assembly drives a piston rod which has a cutting blade attached at to the end thereof. A shaft houses the piston rod and provides a blade sheath into which the cutting blade slides. Once the cutting blade is advanced so as to cut a desired object, the fluid pressure behind the piston is released. A spring then returns the piston to its original position.

The piston assembly, in one embodiment, comprises a piston and a seal which is operable between two positions. In a first resting position, the seal is slightly retracted radially inward from the interior surface of the housing, thereby forming a gap between the housing and the seal. As a fluid, such as water or air, enters the housing, the seal is outwardly pressed so as to effect a biased substantial sealed engagement between interior surface of the housing and the piston. In this position, the fluid pressure builds behind the piston causing the piston assembly to advance within the housing, thereby advancing the cutting blade within the blade sheath. When the applied fluid pressure is released, the seal resiliently returns to its original resting position. Fluid behind the piston is then able to escape through the gap formed between the seal and the housing. As the fluid escapes, the spring resiliently biases the piston back into its original position.

The present invention provides a number of different embodiments for allowing the seal to function in the two operable positions. The seal may be disposed in an annular groove in the piston. Pressure from the fluid is channeled onto the seal to force it outward against the interior surface of the housing. In another embodiment, a plate may be used to force the seal against the interior surface of the housing. Still in other embodiments, the pressure of the fluid may independently serve to force the seal against the interior surface of the housing.

The present invention also provides for safe operation of the cutting tool and provides for a tool that is light-weight. The cutting tool may operate hydraulically or pneumatically. The operator can also use a number of different attachments and lengths of attachments on the end of the cutting tool.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention provides a light-weight cutting tool which may be used in various environments. The cutting tool may utilize a water source to actuate the cutting tool, thus providing a hydraulic device. In alternative embodiments, the cutting tool may use air pressure, thus actuating the cutting tool pneumatically. Other sources of fluid may be used to actuate the cutting tool without departing from the scope of the present invention. As used herein, the term "fluid" may refer to any liquid, gas, or combination thereof.

The present invention also provides various novel piston assemblies employing a simplistic design. The piston assemblies act to create a substantially water-tight seal between the piston and the chamber of the cutting tool which facilitates the hydraulic and/or pneumatic actuation. Further, the piston assemblies assist in releasing the hydraulic and/or pneumatic pressure created in the housing so as to release the cutting tool and return the piston to a resting position. Such piston assemblies provide efficiency in operation and a reduction in manufacturing cost.

Figures 1, 3:
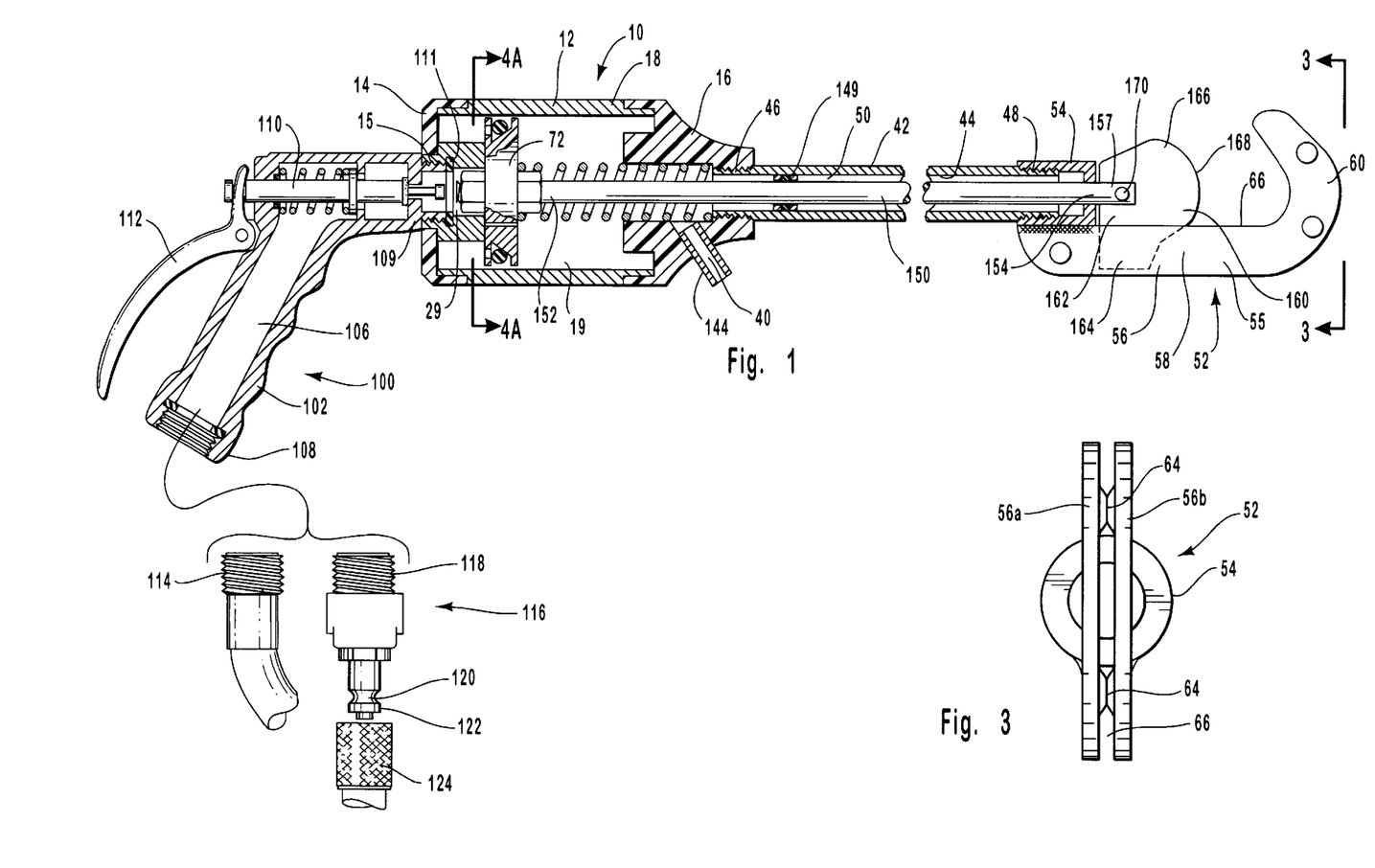
FIG. 1 is a cross-sectional side view of one embodiment of a cutting tool assembly in a resting position.
FIG. 3 is a front elevational view of the cutting tool assembly shown in FIG. 1 taken along line 3—3 of FIG. 1.
Figure 1A:
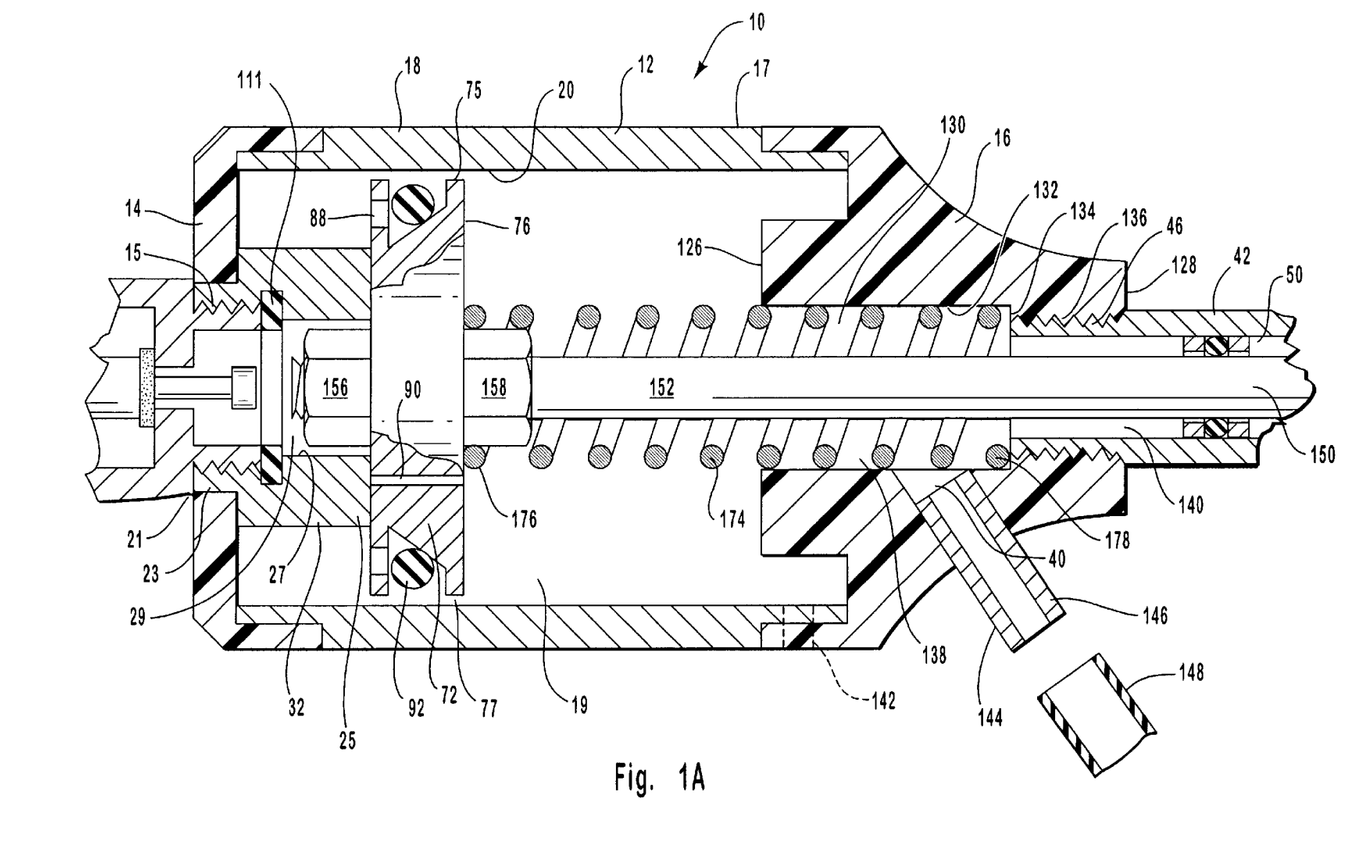
FIG. 1A is an enlarged cross-sectional side view of the housing of the cutting tool shown in FIG. 1.

Depicted in FIGS. 1 and 1A is one embodiment of a cutting tool 10 incorporating features of the present invention. Cutting tool 10 includes a housing 12 having a first end cap 14, a second end cap 16, and a tubular side wall 18 extending therebetween. Housing 12 has an exterior surface 17 and an interior surface 20. Interior surface 20 bounds a chamber 19. In one embodiment, first end cap 14 and/or second end cap 16 are threadably attached to side wall 18 to enable a user to open housing 12. One skilled in the art will recognize, however, that while FIG. 1 shows housing 12 in three distinct parts that housing 12 may be formed integrally or in fewer or more parts without departing from the scope of the present invention. In addition, the various parts of housing 12 can be secured together by welding, adhesive, or releasably secured together using various forms of conventional latches or connectors. Furthermore, although housing 12 is shown having a substantially cylindrical exterior surface 17 and interior surface 20, in alternative embodiments exterior surface 17 and interior surface 20 can have a variety of different configurations.

A central opening 21 extends through first end cap 14 of housing 12. Disposed within opening 21 is a tubular support stem 32. Specifically, support stem 32 has a first end 23 secured within opening 21 and an opposing second end 25 that projects into chamber 19. Support stem 32 has an interior surface 27 that bounds a fluid inlet 29. Fluid inlet 29 provides fluid communication between the exterior and chamber 19. Formed on interior surface 27 at first end 23 of support stem 32 are threads 15. In alternative embodiments, support stem 32 can be integrally formed with first end cap 14. Furthermore, threads 15 can be formed directly on first end cap 14 while support stem 32 simply projects inward from first end cap 14.

In one embodiment, threads 15 are configured to facilitate coupling with a conventional pistol hose fitting 100. As depicted in FIG. 1, pistol hose fitting 100 comprises a handle 102 bounding a channel 106 that extends between an inlet end 108 and an opposing outlet end 109. Outlet end 109 is threadedly coupled with support stem 32. An o-ring 111 is disposed between pistol hose fitting 100 and support stem 32 to effect a liquid tight connection therebetween. A sealing mechanism 110 is disposed within handle 102. A trigger 112 pivotally mounted on handle 102 is coupled with sealing mechanism 110 to enable manual operation of sealing mechanism 110. That is, as trigger 112 is compressed toward handle 102, sealing mechanism 110 is opened allowing fluid to flow through channel 106. As trigger 112 is released, sealing mechanism 110 is closed, thereby stopping the flow of fluid through channel 106. It is appreciated that in alternative embodiments a variety of different types of either specially designed or conventional hose fitting can be coupled with fluid inlet 29 of housing 12 to selectively control the flow of fluid into chamber 19.

Where it is desired to hydraulically operate cutting tool 10, inlet end 108 of pistol hose fitting 100 is threadedly coupled with a hose 114, such as a conventional garden hose, which in turn is coupled with an available spigot. In this configuration, pistol hose fitting 100 regulates the flow of water into chamber 19 of cutting tool 10, thereby hydraulically actuating cutting tool 10.

In one embodiment it is also envisioned that cutting tool 10 can be pneumatically operated. Under this embodiment a tubular quick-connect adapter 116 is provided. Adapter 116 has a threaded first end 118 configured to threadedly couple with inlet end 108 of pistol hose fitting 100. Adapter 116 also has a conventional quick connect male fitting 120 located at an opposing second end 122. Male fitting 120 is configured for selective coupling with a conventional air hose 124 that is in turn coupled with a compressor (not shown). One type of quick-connect adapter 116 can be obtained from Michigan Industrial Tool out of Grand Rapids, Mich. In this configuration, pistol hose fitting 100 is used to regulate the flow of compressed air into chamber 19 of cutting tool 10, thereby pneumatically actuating cutting tool 10.

It is of course appreciated that the compressor can also be used to supply water or other fluids or gasses for the operation of cutting tool 10. It is also appreciated that the use of cutting tool 10 with an air compressor may require increasing the structural strength of the cutting tool 10 and hose fitting 10 compared to hydraulic operation of the system. Thus one embodiment of cutting tool 10 may be designed solely for hydraulic operation or pneumatic operation while other embodiments may be designed for both hydraulic and pneumatic operation.

Returning to FIG. 1A, second end cap 16 has an inside face 126 partially bounding chamber 19 and an exposed outside face 128. Longitudinally extending between faces 126 and 128 is channel 130 bounded by an inner surface 132. Channel 130 includes a first channel portion 138 extending from inside face 126 to an inwardly projecting shoulder 134 of inner surface 132. Channel 130 also includes a second channel portion 140 extending from shoulder 134 to outside face 128. Threads 136 are formed on the portion of inner surface 132 bounding second channel portion 140.

A fluid outlet 40 extends between first channel portion 138 and outside face 128 of second end cap 16. Fluid communication is thus provided between chamber 19 and the exterior through first channel portion 138 and fluid outlet 40. In alternative embodiments, it is appreciated that fluid outlet 40 need not communicate with first channel portion 138 but can be placed anywhere along housing 12 so long as fluid is allowed to escape through fluid outlet 40 when cutting tool 10 is in operation. For example, fluid outlet 40 can also be positioned so as to extend through side wall 18 and communicate directly with chamber 19 as shown by dashed lines 142.

In one embodiment, a tubular stem 144 is securely disposed within fluid outlet 40 such that an attachment end 146 is freely exposed. Tubing 148 can be selectively slid over attachment end 146 so that the fluid exiting fluid outlet 40 is channeled through tubing 148. Tubing 148 can be of any desired length so that the exiting fluid can be channeled away from the user and directed to a desired location for discharging. If desired, spray or sprinkler attachments can be mounted at the discharge end of tubing 148.

Depicted in FIGS. 1 and 1A, cutting tool 10 further comprises a tubular shaft 42 having an interior surface 44 longitudinally extending between a first end 46 and an opposing second end 48. Interior surface 44 bounds a conduit 50. First end 46 of shaft 42 is threadedly coupled within second channel portion 140 of second end cap 16.

As depicted in FIGS. 1 and 3, attached to the second end 48 of tubular shaft 42 is a sheath assembly 52. Sheath assembly 52 includes a tubular collar 54 which is threadedly attached to second end 48 of shaft 42. Secured to collar 54, such as by welding, is a blade sheath 55. Blade sheath 55 includes a pair of adjacently disposed arms 56A and 56B. Each arm 56A, 56B has an elongated body portion 58 that terminates at a hooked or substantially U-shaped finger 60. Arms 56A, 56B are secured together such as by welding, bolts, rivets, or the like with spacers 64 disposed therebetween so that a slot 66 is formed between arms 56A, 56B.

Figures 2, 4A, 4B:
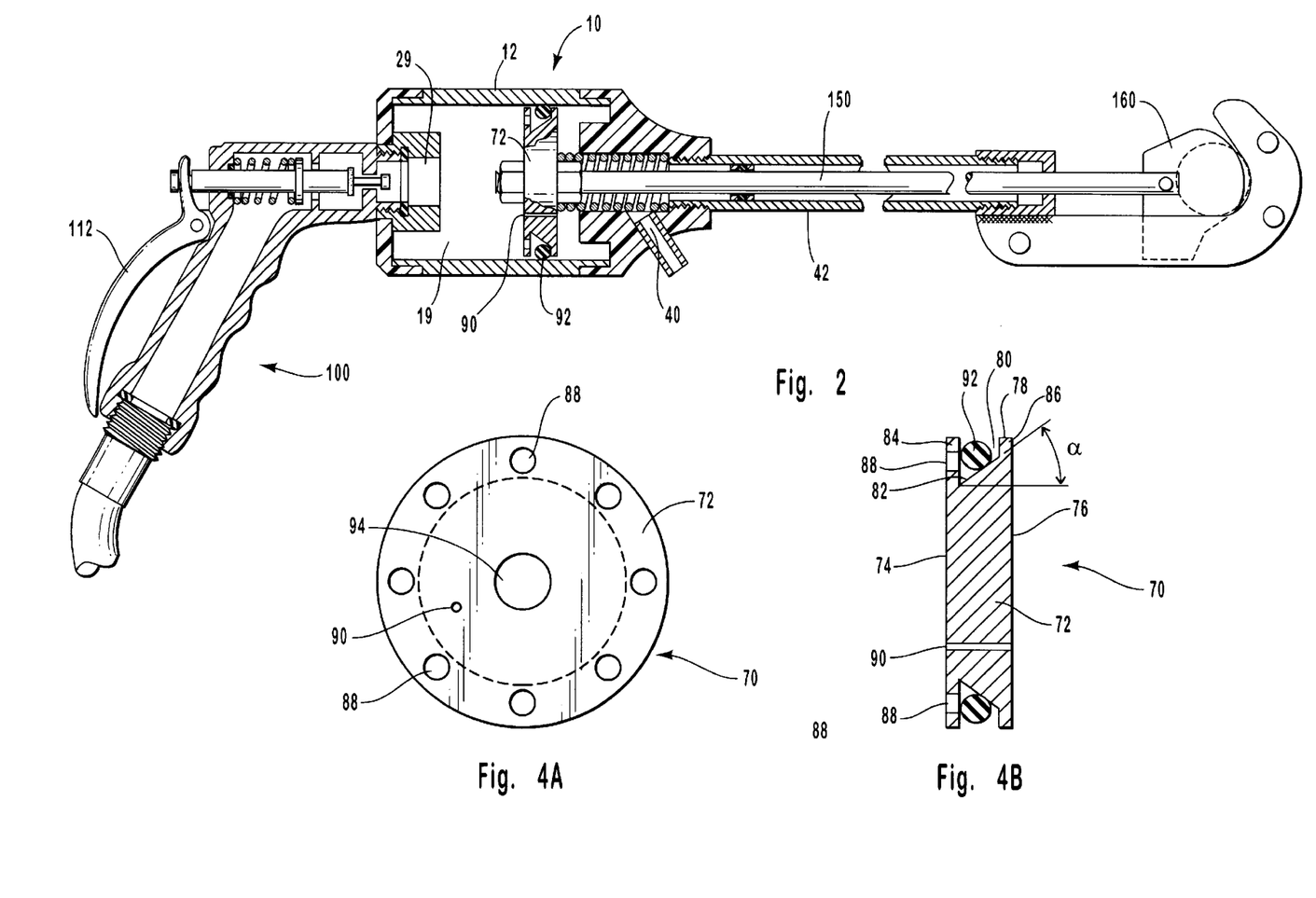
FIG. 2 is a cross-sectional side view of the cutting tool assembly shown in FIG. 1 in an actuated position.
FIG. 4A a back elevational view of a piston assembly shown in FIG. 1 taken along line 4A—4A of FIG. 1.
FIG. 4B is a cross-sectional side view of the piston assembly shown in FIG. 4A.

Turning to FIGS. 1A, 4A, and 4B, slidably disposed within chamber 19 is a piston assembly 70. Piston assembly 70 includes a substantially disk shaped piston 72 having a front face 74, an opposing back face 76, and an annular side wall 78 extending therebetween. Piston 72 has substantially the same transverse cross-section as chamber 19. A gap 75, however, is formed between the maximum outer diameter of piston 72 and interior surface 20 of housing 12 such that an annular channel 77 is formed therebetween. In one embodiment, gap 75 has a distance in a range between about 0.001 inches to about 0.01 inches with about 0.001 inches to about 0.003 inches being more preferred. Alternative embodiments can have a different dimensions depending on the configuration and intended manner of operation.

Recessed within side wall 78 is an annular groove 80 that encircles piston 72. Groove 80 is bounded by an outwardly sloping annular floor 82 that extends between an annular first retention lip 84 and an annular second retention lip 86. In one embodiment, floor 82 is sloped at an angle α relative to the horizontal in a range between about 30° to about 55° with about 35° to about 50° being more preferred. Although retention lips 84 and 86 extend to substantially the same perimeter, lip 84 is longer due to the slope of floor 82. As discussed below in greater detail, a plurality of pressure ports 88 extend through first retention lip 84 so as to facilitate fluid communication between chamber 19 and groove 80. Furthermore, a bleed port 90 extends through piston 72. Although bleed port 90 can be a variety of different sizes, bleed port 90 typically has a circular cross section with a diameter in a range between about 0.01 inches to about 0.1 inches with about 0.03 inches to about 0.07 inches being more preferred.

In one embodiment of the present invention, means are provided for forming a substantially water-tight seal between piston 72 and interior surface 20 of housing 12 when pressure from fluid is applied to piston 72 and for enabling fluid to pass between the piston 72 and interior surface 20 of housing 12 as pressure from the fluid is as decreased (hereinafter referred to as "seal means"). By way of example and not by limitation, one example of the seal means comprises annular groove 80 and pressure ports 88 as discussed above acting in conjunction with a seal 92 in the form of an elastomeric annular O-ring disposed within annular groove 80. Seal 92 is movable between positions to produce a temporary, substantially water-tight seal between piston 72 and housing 12. For example, as depicted in FIGS. 1 and 1A, seal 92 is in a constricted resting position within annular groove 80 so that annular channel 77, formed between piston 72 and housing 12, is open. As fluid enters chamber 19 through fluid inlet 29, the fluid is channeled through pressure ports 88 and momentarily exists through annular channel 77. As the channeled fluid passes seal 92, however, the passing fluid functions to push and/or suck seal 92 outward against sloping floor 82 so as to substantially seal annular channel 77 as depicted in FIG. 2. Once the fluid inlet 29 is closed, the fluid pressure produced within chamber 19 is decreased as a result of fluid seeping out through bleed port 90. Once the pressure is decreased, seal 92 resiliently constrict to its resting position, thereby opening annular channel 77.

As depicted in FIGS. 1 and 1A, slidably disposed within chamber 19, channel 130 of second end cap 16, and conduit 50 of tubular shaft 42 is an elongated piston rod 150. In one embodiment, a seal 149 is disposed between interior surface 44 of shaft 42 and piston rod 150 so as to produce a liquid tight seal and yet allow piston rod 150 to freely slide within tubular shaft 42. Piston rod 150 has a first end 152 secured to piston 72 and an opposing second end 154. A slot 157 is formed at second end 154 along the longitudinal axis of piston rod 150. In the embodiment shown, piston rod 150 is secured to piston 72 by passing first end 152 of piston rod 150 through a central opening 94 of piston 72 and tightening nuts 156 and 158, threaded on piston rod 150, against opposing sides of piston 72. If desired, lock washers can be position between the nuts 156 and 158 and piston 72. In other embodiments piston rod 150 can be attached to piston 72 by any means known in the art such as by threadable attachment, screwing, bolting, welding, brazing, adhesive, and the like.

Secured to the second end of piston rod 150 is a blade 160. Blade 160 comprises a body 162 having an alignment tab 164 and a curved head 166 that terminates at a sharpened edge 168. In the embodiment shown, blade 160 is attached to piston rod 150 by inserting blade 160 into slot 157 and then passing a pin 170 through piston rod 150 and blade 160. Welding and other conventional attachment structures and methods can also be used. In the attached position, alignment tab 164 is slidably received within slot 66 of blade sheath 55.

Encircling piston rod 150 within chamber 19 is a coiled spring 174. Spring 174 has a first end 176 biased against back face 76 of piston 72 and an opposing second end 178 disposed within channel 130 of second end cap 16 and biased against shoulder 134. Spring 174 is configured to produce a resilient force that biases piston 72 against support stem 32. In this regard, support stem 32 functions as a stop for piston 72.

The operation of cutting tool 10 will now be described. Depicted in FIGS. 1 and 1A, cutting tool 10 is in a resting position where no fluid pressure is being applied to piston assembly 70. In this resting position, spring 174 biases piston 72 against support stem 32. As a result, blade 160 is in a retracted position enabling the positioning of an element to be cut, such as a branch or pipe, between blade 160 and curved finger 60 of blade sheath 55. Once the element to be cut is positioned, trigger 112 of pistol hose fitting 100 is depressed allowing a pressured fluid, such as water or air, to enter into chamber 19 through fluid inlet 29.

As depicted in FIG. 2, as the fluid enters chamber 19 it is channeled through pressure ports 88 causing seal 92 to bias against interior surface 20 of housing 12. Due to the substantially water-tight seal created by seal 92 when under pressure, the fluid is substantially retained on the fluid inlet side of piston 72. The resulting pressure produced by the fluid causes piston 72 to advance toward second end cap 16 of housing 12, thereby compressing spring 174.

As piston 72 advances within chamber 19, piston rod 150 simultaneously advances out of shaft 42. In turn, blade 160 moves along slot 66 toward curved finger 60 of blade sheath 55, thereby cutting the element caught between blade 160 curved finger 60 of blade sheath 55. Bleed port 90 is sufficiently small so that any pressure lost through bleed port 90 is insubstantial compared to the amount of pressure maintained behind front face 74 of piston 72. Any fluid leakage past piston 72 flows out through fluid outlet 40 away from the operator.

Once the element is cut, trigger 112 of pistol hose fitting 100 is released, thereby preventing further fluid from entering chamber 19. The pressure within chamber 19 then begins to decrease as the fluid flows through bleed port 90 and escapes through fluid outlet 40. In turn, as the pressure decreases, seal 92 resiliently returns to its original resting position. As seal 92 constricts, annular channel 77 is opened allowing the fluid to rapidly flow past piston 72 and out fluid outlet 40. As the fluid escapes past piston assembly 70, spring 174 resiliently biases piston assembly 70 back to its original position, thereby moving blade 160 back to its retracted position in preparation for receiving another element for cutting. It is noted that the force applied by spring 174 contributes to force the fluid through annular channel 77 and bleed port 90.

The present invention includes means for automatically returning the piston assembly toward fluid inlet 29 when the fluid is removed from within housing 12 through fluid outlet 40 (hereinafter referred to as "spring means"). One example of the spring means comprises coiled spring 174 as discussed above. The present invention also envisions the spring means to encompass a variety of alternative embodiments. For example, coiled spring 174 can be replaced with a leaf spring or other type of spring that is disposed within chamber 19 and biased against piston 72. Furthermore, a coiled extension spring or bungee type spring can be secured between first end cap 14 and piston 72 so as to effectively pull piston 72 back toward first end cap 14.

In the embodiment depicted in FIGS. 1 and 2, bleed port 90 is described as being used to release the fluid pressure within chamber 19. In alternative embodiments, it is appreciated that cutting tool 10 can be made without bleed port 90. That is, by allowing some fluid leakage either at fluid inlet 29 or at the seal of annular channel 77, sufficient pressure can be released to enable the retraction of seal 92 and thus the complete opening of annular channel 77. In this regard, seal 92 need only produce a "substantially" liquid tight seal between housing 12 and piston 72. In general, the smaller the opening of bleed port 90 or other related fluid leak, the longer it will take before annular channel 77 opens and thus the longer it will take before piston 72 is returned for a subsequent advancement. On the other hand, bleed port 90 or other related fluid leak cannot be too large or insufficient pressure will be built up behind piston 72 to facilitate cutting of a desired element.

Cutting tool 10 also provides a design for housing 12 which results in a light-weight tool. As seen in FIGS. 1 and 2, second end cap 16 of housing 12 is configured to minimize the amount of fluid volume in chamber 19 and yet provide sufficient room for spring 174 to operate. Specifically, second end cap 16 of housing 12 has a tapered outside edge which reduces the volume of chamber 19. Those skilled in the art will recognize that when water is used, water weight causes the tool to become heavy. Ideally, cutting tool 10 should be configured to be used by people of all ages and strength. Thus, reducing the volume of fluid in chamber 19 results in a light-weight tool. In addition, second end cap 16 of housing 12 is configured to receive spring 174 of sufficient length and strength to restore piston assembly 70 to its original resting position. Second end cap 16 is shown in FIG. 1 as having a channel 130 which receives spring 174 and provides sufficient room for spring 174 to retract (FIG. 2) and protract.

Figure 5:
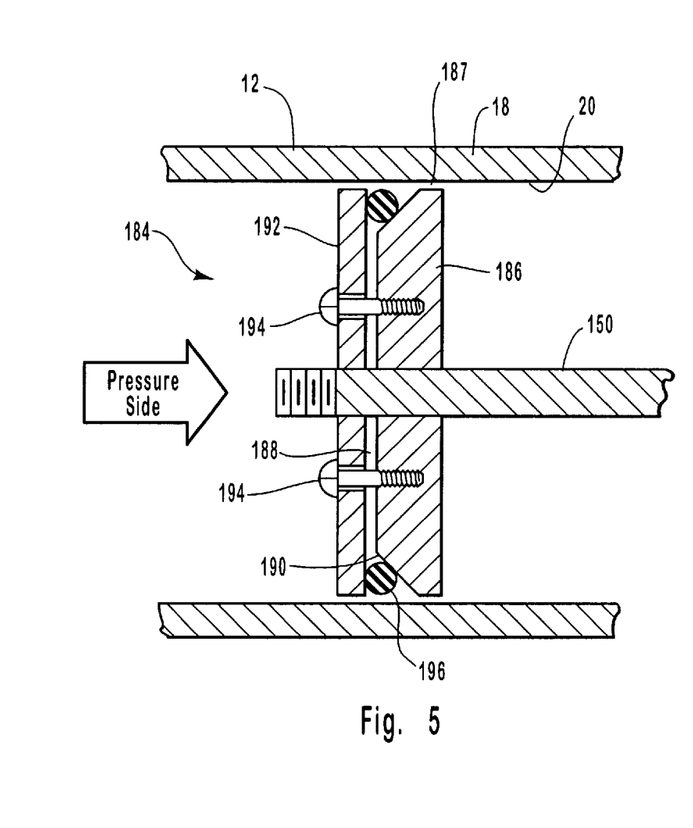
FIG. 5 is a cross-sectional side view of an alternative embodiment of a piston assembly comprising a seal ring disposed between a piston and a movable plate.

Depicted in FIGS. 5–9 are alternative embodiments of piston assemblies which incorporate some from of sealing means for use within housing 12. In the various embodiments, like elements are identified by like reference characters. Depicted in FIG. 5 is a piston assembly 184 that includes a piston 186 attached to piston rod 150. Piston 186 has an inside face 188 with an annular outwardly tapered edge 190. Piston 186 is spaced slightly inward from housing 12 so that an annular channel 187 is formed between piston 186 and housing 12.

The sealing means operable with piston 186 includes a plate 192 that is movably attached to piston 186 by bolts 194 that extend through plate 192 and secure to piston 186. An annular O-ring seal 196 is biased between tapered edge 190 of piston 186 and plate 192. As pressure is applied to plate 192, plate 192 is pressed towards piston 186, thereby biasing O-ring seal 196 against interior surface 20 of housing 12 so as to produce a substantially water-tight seal between piston 186 and housing 12. As the fluid pressure is release, such as through a bleed port or leakage at seal 196, seal 196 constricts pushing plate 192 back to the original position and opening annular channel 187.

Figure 6:
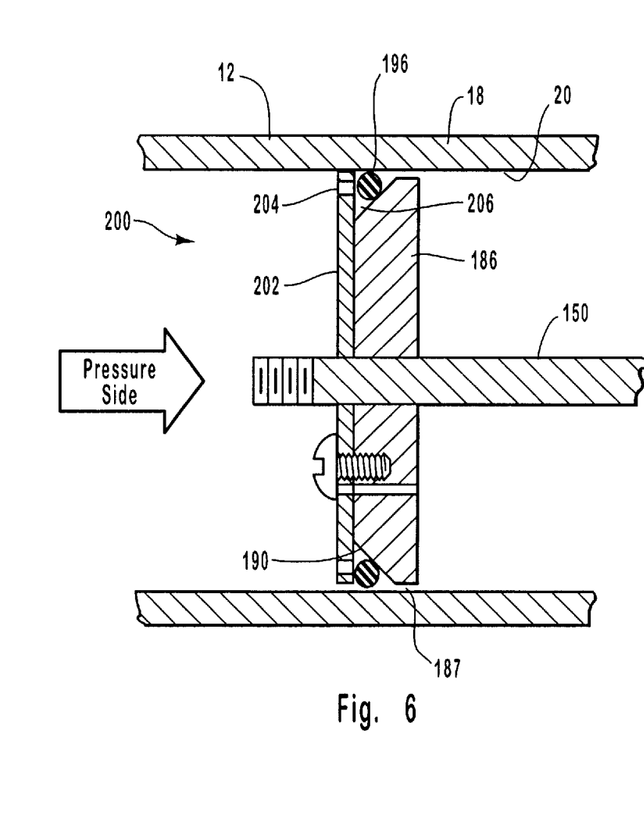
FIG. 6 is a cross-sectional side view of an alternative piston assembly comprising a seal ring disposed between a piston and a fixed plate.

Depicted in FIG. 6 is another alternative embodiment of a piston assembly 200. Piston assembly 200 includes piston 186 shown in FIG. 5 and a plate 202 secured directly to piston 186 so that an annular tapered slot 206 is formed between tapered edge 190 and plate 202. Plate 202 and piston 186 can be secured together by any means known in the art such as, but not limited to, screws, bolts, rivets, adhesion, and the like. One or more pressure ports 204 extend through plate 202 and communicate with tapered slot 206. O-ring seal 196 is disposed within annular slot 206. For substantially the same reasons as discussed with the embodiment depicted in FIGS. 1 and 2, O-ring seal 196 is biased against interior surface 20 of housing 12 so as to produce a substantially liquid-tight seal as fluid passes through pressure ports 204.

Figure 7A:
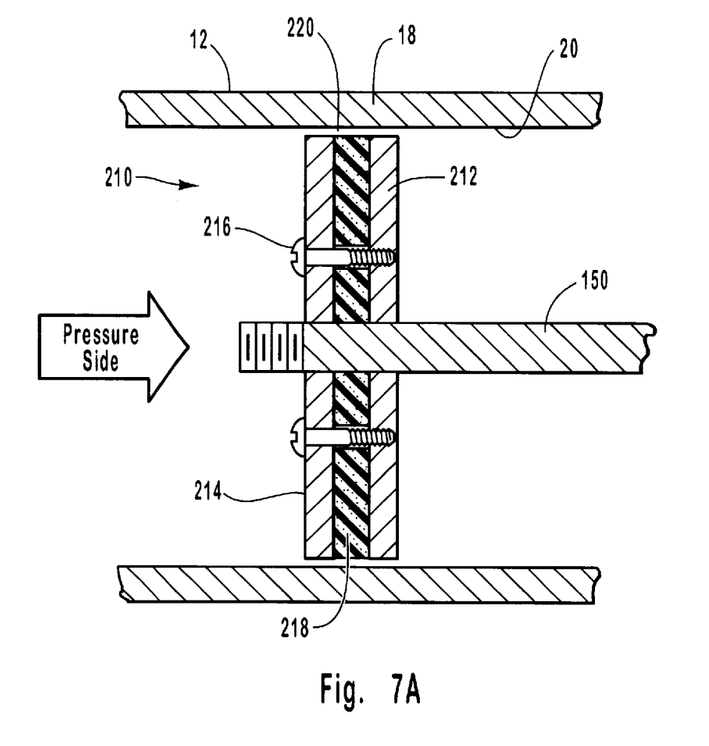
FIG. 7A is a cross-sectional side view of an alternative embodiment of a piston assembly comprising a flexible gasket between a piston and a movable plate in a resting position.
Figure 7B:
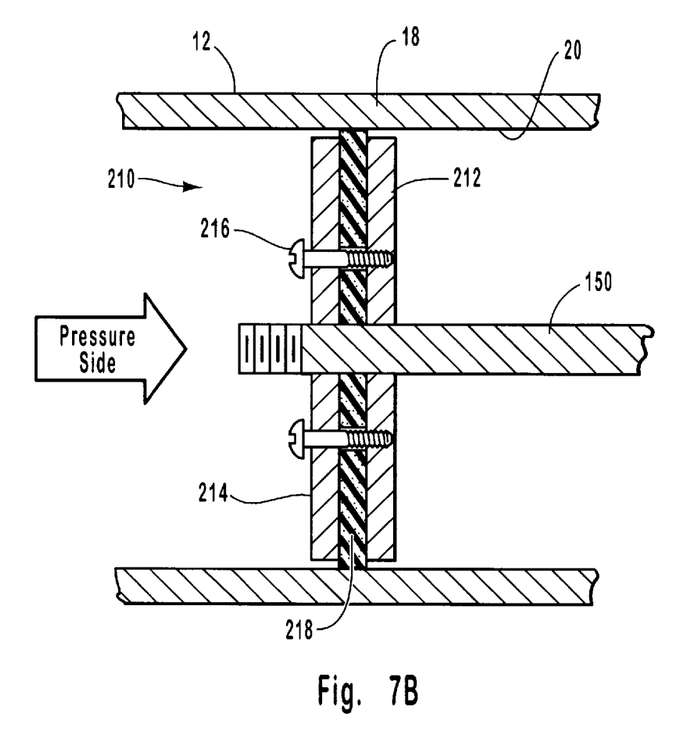
FIG. 7B is a cross-sectional side view of the piston assembly shown in FIG. 7A in a pressurized position.

Depicted in FIGS. 7A and 7B is another alternative embodiment of a piston assembly 210 incorporating features of the present invention. Piston assembly 210 includes a piston 212 mounted on piston rod 150. The sealing means comprises a plate 214 moveably mounted to piston 212 by bolts 216 that extend through plate 214 and engage piston 212. Disposed between plate 214 and piston 212 is a substantially flat seal 218. In FIG. 7A, no fluid pressure is applied to piston assembly 210 and an annular channel 220 extends between piston assembly 210 and interior surface 20 of housing 12. In FIG. 7B, fluid pressure is applied to plate 214 which pushes against seal 218. In turn, seal 218 outwardly expands to produce a substantially liquid-tight seal against interior surface 20 of housing 12.

Figure 8A:
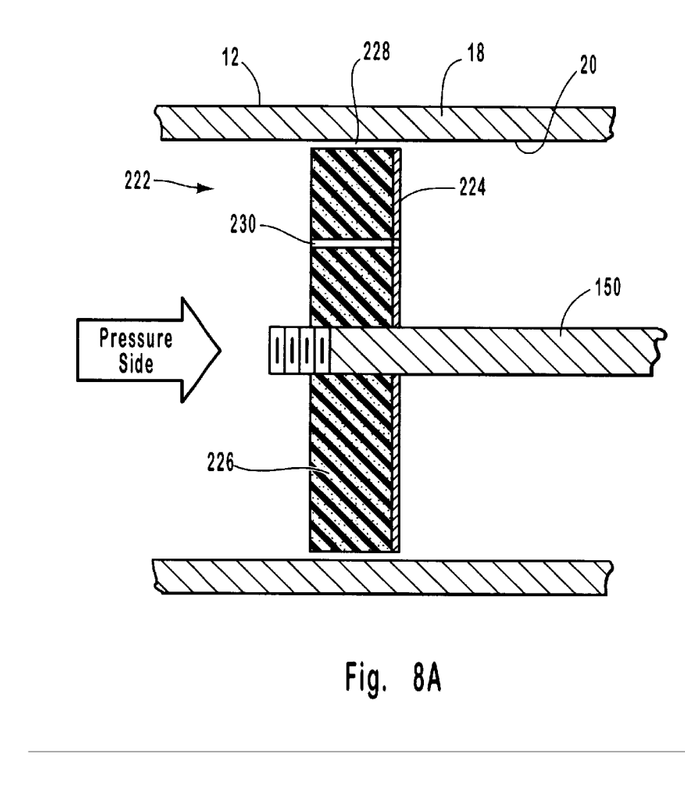
FIG. 8A is a cross-sectional side view of an alternative embodiment of a piston assembly comprising a flexible gasket biased against a piston in a resting position.
Figure 8B:
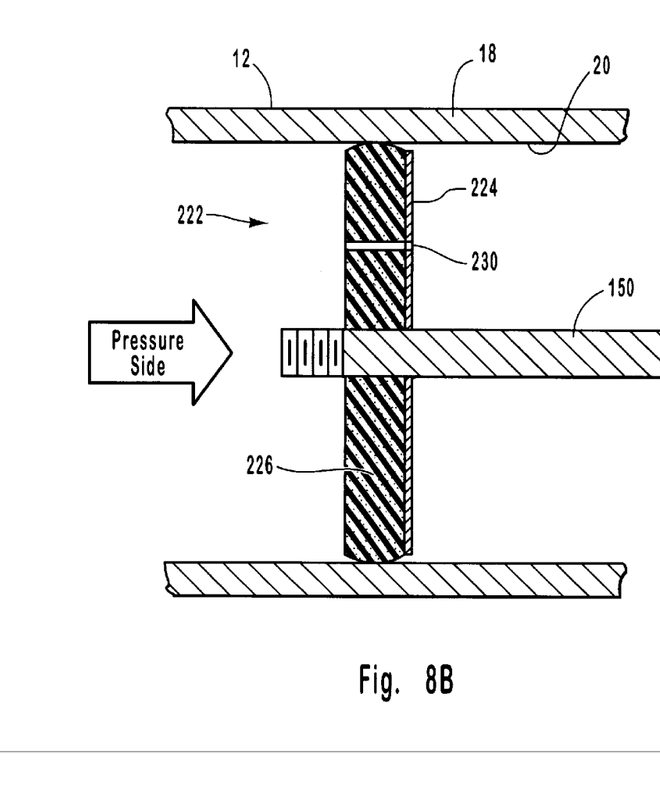
FIG. 8B is a cross-sectional side view of the piston assembly shown in FIG. 8A in an pressurized position.

Depicted in FIGS. 8A and 8B is an alternative embodiment of a piston assembly 222 incorporating features of the present invention. Piston assembly 222 includes a piston 224 having a seal 226 secured on a front face thereof. Depicted in FIG. 8A no fluid pressure is applied to seal 226 and an annular channel 228 is formed between piston assembly 222 and interior surface 20 of housing 12. Depicted in FIG. 8B, fluid pressure is applied to seal 226 causing it to bow out and produce a substantially liquid tight seal against interior surface 20 of housing 12. Although piston assembly 222 is shown as having a bleed port 230, as previously discussed it is appreciated that in each of the piston assembly embodiments, the system can operate with or without a bleed port. In those systems where a bleed port is not used, some form of fluid leak must be provided such as at the seal with housing 12, at some other location within chamber 19, or at a location upstream of fluid inlet 29.

Figure 9A:
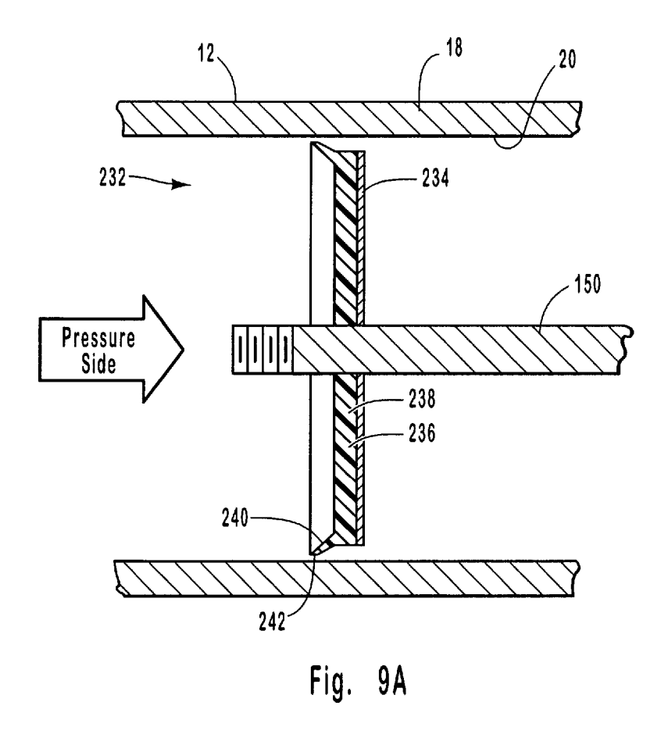
FIG. 9A is a cross-sectional side view of an alternative embodiment of a piston assembly comprising a winged seal biased against a piston in a resting position.
Figure 9B:
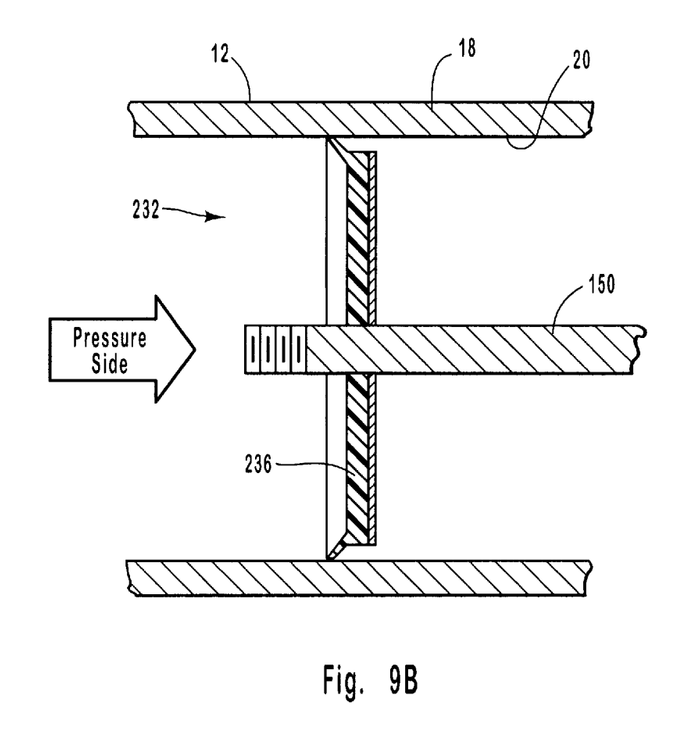
FIG. 9B is a cross-sectional side view of the piston assembly shown in FIG. 9A in a pressurized position.

Depicted in FIGS. 9A and 9B is another embodiment of a piston assembly 232. Piston assembly 232 includes a piston 234 attached to piston rod 150. The sealing means comprises a seal 236 having a body portion 238 attached to piston 234. An annular flexible wing 240 projects forward and outward from body 238. In FIG. 9A, no fluid pressure is applied to seal 236 and an annular channel 242 extends between seal 236 and interior surface 20 of housing 12. In FIG. 9B, fluid pressure is applied to seal 236 such that wing 240 flexes to bias against interior surface 20 of housing 12, thereby producing a substantially liquid tight seal therewith. If desired, a bleed port can be positioned to extend either through both seal 236 and piston 234 or simply through wing 240. In yet other embodiments, a notch or other type of opening can be formed in wing 240 so as to allow select bleeding of fluid from chamber 19.

The foregoing embodiments of the piston assemblies are presented by way of illustration and not by limitation. Each embodiment provides a piston and some form of sealing means. In each embodiment, different ways of harnessing the pressure that enters chamber 19 are provided to cause the seal to perform its selective sealing function. The simplicity and cost-effectiveness of the foregoing embodiments result in substantial improvement in the art.

In yet another embodiment, a piston assembly can be implemented that does not incorporate a seal. For example, in this embodiment seal 226 is removed from piston 224 in the embodiment depicted in FIGS. 8A and 8B. By producing a sufficiently tight tolerance between piston 224 and interior surface 20 of housing 12, i.e., minimizing the size of annular channel 228, sufficient pressure can be produced behind piston 224 as fluid enters chamber 19 so as to effectively advance piston 224. Once the incoming fluid is shut off, the pressure within chamber 19 is released by fluid passing through annular channel 228 and, if implemented, bleed port 230. By way of example, in this embodiment the gap between interior surface 20 of housing 12 and the outer perimeter of piston 224 is typically in a range between about 0.001 inches and about 0.003 inches.

Figure 10A:
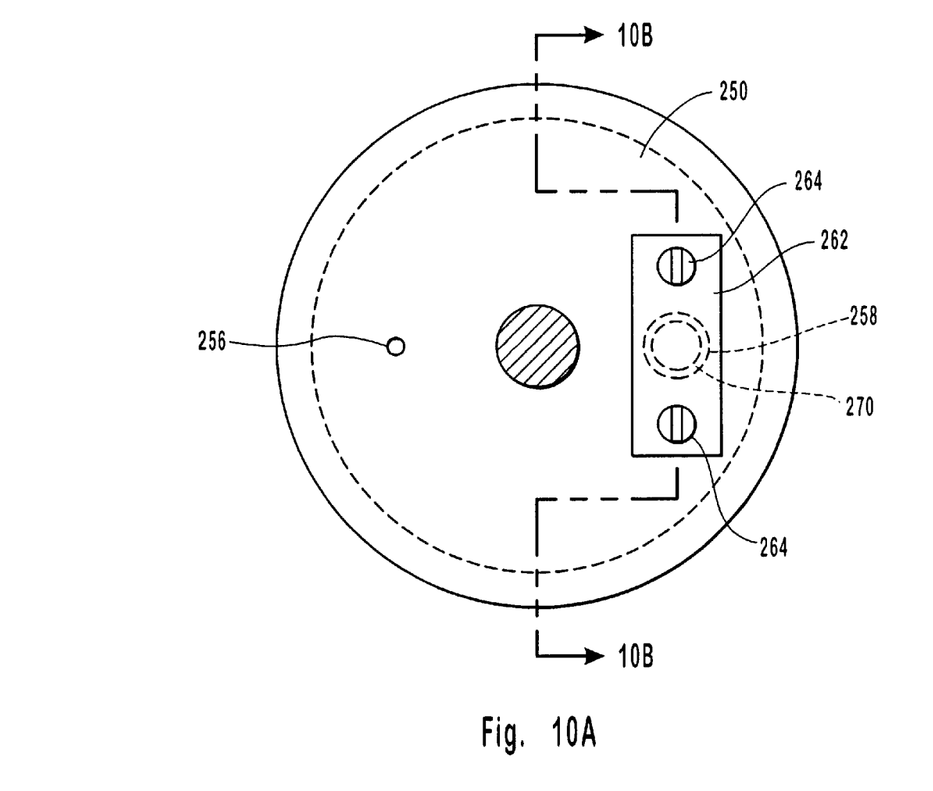
FIG. 10A is an elevated front view of an alternative piston assembly incorporating an mechanical valve.
Figure 10B:
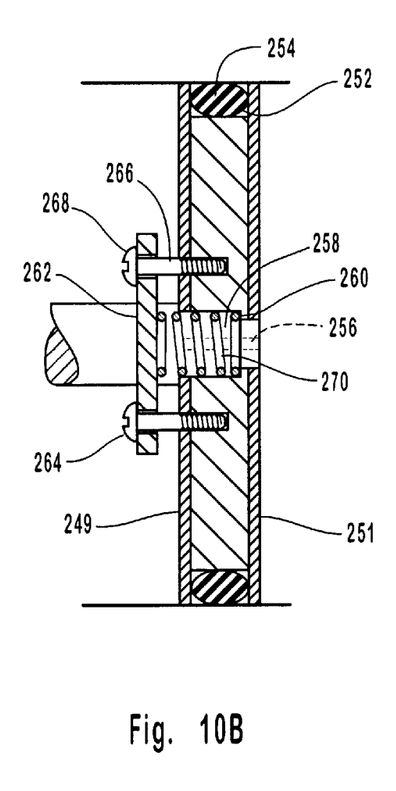
FIG. 10B is a cross sectional side view of the embodiment shown in FIG. 10A.

In contrast to using the piston assemblies discussed above, a piston assembly can also be used where a mechanical valve is incorporated into the piston. For example, depicted in FIGS. 10A and 10B is a piston 250 having a front face 249 and an opposing back face 251. An annular recessed channel 252 encircles around the perimeter of piston 250. Disposed within channel 252 is an annular O-ring 254 that is configured to provide a continuous seal between piston 250 and interior surface 20 of housing 12.

Extending through piston 250 is a bleed port 256. Also extending through piston 250 between faces 249 and 251 is flow port 258. Radially inwardly projecting into flow port 258 is an annular shoulder 260. Positioned over flow port 258 on front face 249 is a gate 262. In the embodiment depicted, gate 262 is in the form of a plate can also be in a variety of alternative configurations. A pair of anchors 264, such as screws, bolts or pins, extend through gate 262 and into piston 250 so as to slidably secure gate 262 to piston 250. Specifically, an exposed portion 266 of each anchor 264 projects from piston 250 to an enlarged head 268. Gate 262 is slidably along exposed portions 266 of anchors 264 so as to either bias against piston 250 and cover flow port 258 or bias against heads 268 of anchors 264, thereby allowing fluid to flow into a through flow port 258.

Disposed within flow port 258 is a spring 270. Spring 270 has a first end biased against shoulder 260 within flow port 258 and an opposing second end biased against gate 262. In a resting position, spring 270 biases gate 262 against heads 268 of anchors 264 so that flow port 258 is open. As a fluid enters chamber 19 through fluid inlet 29, the fluid pushes against gate 262 sealing it against piston 250, thereby sealing flow port 258 closed. With flow port 258 closed, the fluid pressure builds causing piston 250 to advance as previously discussed. Once the incoming fluid is stopped, fluid seeps out through bleed port 256. As the fluid starts to escape and the pressure is released, spring 270 pushes gate 262 away from piston 250, thereby allowing the fluid to easily escape through flow port 258.

It is appreciated that other mechanical valves can also be incorporated into piston 250. For example, a spring biased ball valve can be disposed and retained within flow port 258. The spring biases the ball into an enlarged portion of flow port 258 so that fluid can flow around the ball and through flow port 258. As the pressure is increased within chamber 19, however, the fluid pressure biases the ball against a constricted portion of flow port 258, thereby sealing off flow port 258. Other embodiments of a valve assembly are disclosed in U.S. Pat. No. 4,198,748 which is incorporated herein by specific reference.

Those skilled in the art will recognize that cutting tool 10 is not limited to the length shown in FIGS. 1 and 2. The operator can extend the length of piston rod 150 and shaft 42 to the desired length by providing a longer piston rod and shaft or adding extensions on the existing piston rod and shaft. When multiple shaft extensions or piston rods are used, there is a possibility that the rod and/or shaft will bend, resulting in misdirection of the blade or weakness in the final cutting action. Thus, it is contemplated that internal guides in the form of ridges will run along the length of the shaft to engage the sides of the piston rod 150 to keep it straight. These internal guides will also strengthen the force of the rod by maintaining the blade in alignment with the blade sheath.

Housing 12 may be constructed of any suitable rigid material, such as polyvinyl chloride or any suitable metal, such as aluminum. The piston 72 may be constructed of any suitable rigid material such as polyvinyl chloride or any suitable metal. Piston rod 150 should also be constructed of a rigid material such as aluminum or any suitable metal. The various seals are preferably a suitable elastomeric material such as rubber, plastic, or the like. Blade 160 is preferably constructed of a steel or stainless steel. Stainless steel is preferably used because it provides corrosion resistance and sufficient hardness to maintain a sharpened edge. Spring 174 can be constructed of any elastomeric material such as metal shaped in a coil configuration, aluminum shaped in a leaf spring configuration, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A cutting apparatus comprising:
   a housing having an interior surface bounding a chamber, the chamber communicating with a fluid inlet and a fluid outlet;
   a piston assembly slidably disposed within the chamber between the fluid inlet and the fluid outlet, the piston assembly being configured such that as fluid enters into the chamber through the fluid inlet, pressure from the fluid advances the piston assembly toward the fluid outlet, the piston assembly comprising:
      a piston; and
      means for forming a substantially water-tight seal between the piston and the interior surface of the housing when pressure from the fluid is applied to the piston and for enabling fluid to pass between the piston and the interior surface of the housing as pressure from the fluid is decreased;
   a blade sheath connected to the housing;
   a cutting blade slidably disposed relative to the blade sheath;
   a piston rod having a first end connected to the piston assembly and an opposing second end connected to the cutting blade; and
   means for automatically returning the piston assembly toward the fluid inlet when the fluid is removed from within the housing through the fluid outlet.

2. The cutting apparatus as recited in claim 1, further comprising a bleed port extending through at least a portion of the piston assembly so as to effect fluid communication between the fluid inlet and the fluid outlet.

3. The cutting apparatus as recited in claim 1, wherein the means for forming a substantially water-tight seal comprises a flexible seal disposed against the piston.

4. The cutting apparatus as recited in claim 4, wherein:
   the piston comprises a first end face and an opposing second end face; and
   the seal is mounted on the first end face.

5. The cutting apparatus as recited in claim 4, wherein the seal comprises a body disposed against the piston and a flexible wing outwardly projecting from the body.

6. The cutting apparatus as recited in claim 1, wherein:
   the piston comprises a first end face and an opposing second end face, and a side wall extending therebetween; and
   the means for forming a substantially water-tight seal comprises an annular groove being recessed within the side wall of the piston, the groove being bounded by an outwardly sloping floor, a ring seal being disposed within the annular groove.

7. The cutting apparatus as recited in claim 6, wherein the means for forming a substantially water-tight seal further comprises at least one pressure port extending from the first end face of the piston to the annular groove.

8. The cutting apparatus as recited in claim 1, wherein the means for forming a substantially water-tight seal comprises:
   a plate movably mounted to the piston; and
   a seal being at least partially disposed between the plate and the piston.

9. The cutting apparatus as recited in claim 1, wherein the means for forming a substantially water-tight seal comprises:
   a structure rigidly attached to the piston such that a slot is formed between the structure and the piston; and
   a seal disposed within the slot.

10. The cutting apparatus as recited in claim 9, further comprising at least one pressure port extending through the structure and communicating with the slot.

11. The cutting apparatus as recited in claim 1, wherein means for automatically returning the piston assembly toward the fluid inlet comprises a spring disposed between the housing and the piston assembly.

12. A cutting apparatus comprising:
   a housing having an interior surface bounding a chamber, the chamber communicating with a fluid inlet at a first end and a fluid outlet at an opposing second end;
   a piston assembly slidably disposed within the chamber between the fluid inlet and the fluid outlet, the piston assembly being configured such that as fluid enters into the chamber through the fluid inlet, pressure from the fluid advances the piston assembly toward the fluid outlet, the piston assembly comprising:
      a piston; and
      a seal disposed adjacent to the piston, the seal being operable between a first position wherein the seal produces a substantially water-tight seal between the piston and the interior surface of the housing and a second position wherein a gap is formed between the seal and the interior surface of the housing such that fluid communication is established between the fluid inlet and the fluid outlet;
   a blade sheath connected to the housing;
   a cutting blade slidably disposed relative to the blade sheath;
   a piston rod having a first end connected to the piston assembly and an opposing second end connected to the cutting blade; and
   a spring disposed between the housing and the piston assembly so as to bias the piston assembly toward the fluid inlet.

13. The cutting apparatus as recited in claim 12, further comprising a bleed port extending through at least a portion of the piston assembly so as to effect fluid communication between the fluid inlet and the fluid outlet.

14. The cutting apparatus as recited in claim 12, wherein:

the piston comprises a first end face, an opposing second end face, and a side wall extending therebetween, an annular groove being recessed within the side wall, the groove being bounded by an outwardly sloping floor; and the seal comprising an annular ring seal disposed within the annular groove.

15. The cutting apparatus as recited in claim 14, further comprising at least one pressure port extending from the first end face of the piston to the annular groove.

16. The cutting apparatus as recited in claim 12, wherein:

the piston comprises a first plate and a second plate, the first plate being movable relative to the second plate; and the seal being at least partially disposed between the first plate and the second plate.

17. The cutting apparatus as recited in claim 16, wherein the seal has the configuration of an O-ring or a substantially flat sheet.

18. The cutting apparatus as recited in claim 12, wherein:

the piston comprises a first plate and a second plate, the first plate being rigidly attached to the second plate such that a slot is formed between the first plate and the second plate, at least one pressure port extending through the first plate and communicating with the slot; and the seal is disposed within the slot.

19. The cutting apparatus as recited in claim 12, wherein:

the piston comprises a first end face and an opposing second end face; and the seal is mounted on the first end face.

20. The cutting apparatus as recited in claim 19, wherein the seal comprises a body disposed against the piston and a flexible wing outwardly projecting from the body.

21. The cutting apparatus as recited in claim 12, wherein the spring comprises a coiled spring extending between the second end of the housing and the piston assembly.

22. The cutting apparatus as recited in claim 12, further comprising:

a handle having a first end and an opposing second end, the handle have a fluid channel extending between the first and second ends, the first end of the handle being fluid coupled with the fluid inlet of the housing; and an air hose quick connect coupling secured to the second end of the handle.

* * * * *

UNITED STATES PATENT AND TRADEMARK OFFICE
CERTIFICATE OF CORRECTION

PATENT NO. : 6,671,966 B2
DATED : January 6, 2004
INVENTOR(S) : John B. Lewis

It is certified that error appears in the above-identified patent and that said Letters Patent is hereby corrected as shown below:

Title page,
Item [56], References Cited, U.S. PATENT DOCUMENTS, please add the following patents:

| | | |
|---|---|---|
| -- 3,808,683 | 5/1974 | Hetherington -- |
| 3,922,782 | 12/1975 | Lind |
| 4,198,748 | 4/1980 | Lewis |
| 4,486,905 | 12/1984 | Felly |
| 4,987,680 | 1/1991 | Garrett |
| 5,070,616 | 12/1991 | Chen |
| 5,125,158 | 6/1992 | Casebolt et al. |
| 5,361,496 | 11/1994 | DeBoalt |
| 5,711,078 | 1/1998 | Patton et al. |
| 5,775,158 | 7/1998 | Hensley et al. -- |

Column 2,
Line 1, after "attached at" remove [to]
Line 64, after "FIG. 4A" insert -- is --

Column 5,
Line 64, before "different" remove [a]

Column 6,
Line 21, after "fluid is" remove [as]
Line 43, after "resiliently" change "constrict" to -- constricts --
Line 59, change "position" to -- positioned --

UNITED STATES PATENT AND TRADEMARK OFFICE
CERTIFICATE OF CORRECTION

PATENT NO.    : 6,671,966 B2
DATED         : January 6, 2004
INVENTOR(S)   : John B. Lewis It is certified that error appears in the above-identified patent and that said Letters Patent is hereby corrected as shown below:

Column 8,
Line 38, change "FIG. 1" to -- FIG. 1A --
Line 42, change "from" to -- form --
Line 59, after "pressure is" change "release" to -- released --
Line 61, change "constricts" to -- constricts, --

Column 10,
Line 28, after "plate" insert -- but --

Column 12,
Line 1, change "claim 4" to -- claim 3 --

Column 14,
Line 22, after "handle" change "have" to -- having --

Signed and Sealed this

Twenty-fifth Day of May, 2004

JON W. DUDAS
*Acting Director of the United States Patent and Trademark Office*